United States Patent
Cianfrocca

(10) Patent No.: US 10,075,415 B2
(45) Date of Patent: Sep. 11, 2018

(54) CONTENT-AWARE FIREWALLING, POLICY REGULATION, AND POLICY MANAGEMENT FOR INDUSTRIAL AUTOMATION, MACHINE-TO-MACHINE COMMUNICATIONS, AND EMBEDDED DEVICES

(71) Applicant: Bayshore Networks, Inc., New York, NY (US)

(72) Inventor: Francis Cianfrocca, Long Island, NY (US)

(73) Assignee: Bayshore Networks, Inc., New York, NY (US)

(*) Notice: Subject to any disclaimer, the term of this patent is extended or adjusted under 35 U.S.C. 154(b) by 18 days.

(21) Appl. No.: 15/685,649

(22) Filed: Aug. 24, 2017

(65) Prior Publication Data
US 2017/0374029 A1    Dec. 28, 2017

Related U.S. Application Data

(63) Continuation of application No. 14/856,549, filed on Sep. 16, 2015, now abandoned.

(60) Provisional application No. 62/051,291, filed on Sep. 16, 2014.

(51) Int. Cl.
*H04L 29/06* (2006.01)

(52) U.S. Cl.
CPC ................. *H04L 63/0227* (2013.01)

(58) Field of Classification Search
CPC ......... H04L 47/10; H04L 47/11; H04L 47/12; H04L 47/2433; H04L 47/2441; H04L 47/2458; H04L 47/32; H04L 49/355; H04L 63/0227; H04L 63/102; H04L 63/1416; H04L 63/1441; H04L 63/145; H04L 63/20
See application file for complete search history.

(56) References Cited

U.S. PATENT DOCUMENTS

| | | | | |
|---|---|---|---|---|
| 8,555,381 | B2 | 10/2013 | McLaughlin et al. | |
| 8,689,333 | B2* | 4/2014 | Aziz | G06F 9/45537 726/24 |
| 8,959,571 | B2* | 2/2015 | Dan | H04L 41/0893 713/167 |

* cited by examiner

*Primary Examiner* — Abiy Getachew

(57) ABSTRACT

In one embodiment, a processor-implemented method for controlling network traffic to and/or from at least one industrial machine, including: (a) receiving, as input, (i) a stored policy object in language form defining at least one desired behavior and/or operational constraint for the at least one industrial machine, and (ii) a stored machine profile defining an association between the language of the stored policy object and at least one control signal or instruction for the at least one industrial machine; (b) detecting, in network traffic to and/or from the at least one industrial machine, a transaction; (c) applying the received policy object and machine profile to the detected transaction to determine whether a desired behavior exists and/or whether an operational constraint is satisfied; and (d) modifying network traffic to and/or from the at least one industrial machine based on the determination in step (c). This permits expression and enforcement of constraints on actual industrial machine behaviors by filtering, modifying or blocking network communications (e.g., control signals and telemetry) that violate constraints or could cause unsafe or inefficient operation.

16 Claims, 2 Drawing Sheets

CONTENT-AWARE FIREWALLING, POLICY REGULATION, AND POLICY MANAGEMENT FOR INDUSTRIAL AUTOMATION, MACHINE-TO-MACHINE COMMUNICATIONS, AND EMBEDDED DEVICES

CROSS-REFERENCE TO RELATED APPLICATION

This application is a continuation of U.S. application Ser. No. 14/856,549, filed Sep. 16, 2015, which claims priority to U.S. Provisional Patent Application Ser. No. 62/051,291, filed Sep. 16, 2014, the disclosures of which are incorporated herein by reference in their entirety.

BACKGROUND

Technical Field

The disclosure relates, generally, to industrial automation, and more particularly, to policy regulation and firewalling for purposes of controlling industrial machines.

Description of Related Art

It is possible for industrial machines to communicate with each other using Ethernet-based networks. These are the same networks that are generally used to link computers together. Traditional practice uses network types other than Ethernets to network industrial machines together, for example DeviceNet and CAN, most notably for the purpose of ensuring that reliability and latency characteristics inherent in Ethernets do not compromise the more stringent safety and efficiency requirements of industrial machines and automation systems.

However, in a departure from traditional practice, it is often seen that machines and automation devices are networked together using Ethernets, as the cost and reliability characteristics of Ethernets become more favorable with continued development. It is also often seen that computers appear networked together on the same Ethernets as industrial machines; and that networks consisting only of computers and other non-industrial devices are now often connected to industrial Ethernets via gateway devices such as switches and routers.

Indeed it is often intentional and desirable for industrial Ethernets to be linked to computer Ethernets, and/or to contain computers themselves. The computers appearing on industrial internets may be connected ad hoc or permanently to the industrial Ethernets; such computers either may share the connectivity of the industrial Ethernet to larger external Ethernets, or may also have independent connections to external Ethernets, in effect constituting ad hoc gateways through which traffic may flow between the industrial Ethernets and the external Ethernets on which the computers appear.

The term "converged network" is used to denote an Ethernet-based network containing both industrial machines and traditional computers; or networks containing one or the other type of device but linked to other Ethernets or WANs through switches, routers or other gateway devices.

When computers are added to industrial Ethernets, or when computer networks are connected via gateways to industrial Ethernets, great value is potentially created, because the computers can originate control signals and receive telemetry from the machines on the industrial Ethernets. At the same time, tremendous vulnerabilities arise, because the computers and the network infrastructure devices such as switches and routers themselves are often quite easy for attackers to compromise, and those devices are subject to malfunctions of hardware and software. Such attacks and malfunctions can create rogue control signals that can render unsafe or inefficient the functioning of industrial machines; and they can expose telemetry to unauthorized or malicious parties.

In addition, however, the electrical and functional characteristics of industrial machines are fundamentally different from those of general-purpose computers used for traditional data processing applications. Although, strictly speaking, some industrial machines might include a computer, industrial machines are not general-purpose computers that would typically be used by a human operator for applications including such as data processing, information retrieval, email, and the like. Rather, industrial machines are specialized machinery, apparatus, and equipment, along with associated parts, attachments, and accessories, that are used for research and development, manufacturing, and related activities, which might or might not embody substantial computing capability in order to implement their specific functionality. One example of an industrial machine is an assembly robot.

A problem very different from those of preventing undesired access to industrial machines through Ethernets by unauthorized users or by other machines through Ethernets, is that of inhibiting network traffic that arrives through Ethernets and is quite normal, typical and innocuous for traditional computers but is disruptive and even dangerous when encountered by industrial machines. This problem does not necessarily involve the presence of a malicious attacker (hence, it is not best characterized as a "security" problem), but rather arises from the natural characteristics of Ethernets themselves. Conventionally, such a mode of traffic recognition and filtration is not available.

Prior art exists regarding access-control methods to address some aspects of these problems. In general, such prior art has focused on the problem of recognizing which specific machines are being targeted with control signals and from which telemetry is being requested or monitored. Based on such recognition, access-control systems can enforce rules permitting or denying accesses from specific computers or machines to other specific computers or machines. In particular, the large body of current practice classified broadly as "network firewalling" is applicable to this aspect of the problem.

Such access-control methods are effective in preventing many kinds of undesirable accesses to machines and computers in industrial Ethernets that contain networked computers or are connected to computer networks. But many problems can be created by accesses that are not prohibited by access-control rules. These problems are quite distinct from those categorized as network security problems.

Among the distinctive issues that arise specifically in Ethernets, which include both traditional computer equipment and industrial machines, are problems of policy regulation; problems arising from the different electrical and functional characteristics of computers and typical industrial machines; and problems arising as machines acquire a broader ability to communicate with one another, thus affecting the functioning of other machines. None of these problem areas has been addressed by current practice or prior art.

The problem of policy regulation in converged networks arises from the goals of controlling the behavior and function of industrial machines from distant control points, and of dispatching telemetry from machines to distant analysis points. These communications tasks are performed through the converged network. But the simplistic approach of simply carrying control signals and telemetry in the native communications language of each of myriad different machines breaks down at scale.

SUMMARY

Embodiments of the disclosure provide solutions to the foregoing problems and additional benefits, by employing a communications language designed to permit the expression of the desired behavior of machines and processes in an abstract and general form that, in turn, can be automatically and dynamically converted to control signals pertaining to specific machines and processes, by a communications device or devices resident on a converged network. At the same time, the same communications devices can enforce conditions and thresholds (for example, speeds, temperatures, pressures, and flow rates) beyond which machines and processes may not be allowed to operate for safety and efficiency reasons.

Embodiments of the disclosure provide languages and devices that permit the expression and enforcement of constraints on actual machine behaviors by filtering, modifying or blocking network communications (e.g., control signals and telemetry) that violate the constraints or may otherwise cause machines to operate unsafely or inefficiently. This is completely different from the filtration performed by network firewalls, even the so-called industrial firewalls. Existing devices focus on permitting or denying communications based on the identity of the endpoints, their position within the network, and even through analysis of the communications protocols (for example, enforcing that protocols such as Modbus or Ethernet/IP are in use and syntactically correct).

In one embodiment, the present disclosure provides a processor-implemented method for controlling network traffic to and/or from at least one industrial machine. The method includes: (a) the processor receiving, as input, (i) a stored policy object in language form defining at least one desired behavior and/or operational constraint for the at least one industrial machine, and (ii) a stored machine profile defining an association between the language of the stored policy object and at least one control signal or instruction for the at least one industrial machine; (b) the processor detecting, in network traffic to and/or from the at least one industrial machine, a transaction; (c) the processor applying the received policy object and machine profile to the detected transaction to determine whether a desired behavior exists and/or whether an operational constraint is satisfied; and (d) the processor modifying network traffic to and/or from the at least one industrial machine based on the determination in step (c).

In another embodiment, the present invention provides a policy-object enforcement device for controlling network traffic to and/or from at least one industrial machine. The device includes a processor adapted to: (a) receive, as input, (i) a stored policy object in language form defining at least one desired behavior and/or operational constraint for the at least one industrial machine, and (ii) a stored machine profile defining an association between the language of the stored policy object and at least one control signal or instruction for the at least one industrial machine; (b) detect, in network traffic to and/or from the at least one industrial machine, a transaction; (c) apply the received policy object and machine profile to the detected transaction to determine whether a desired behavior exists and/or whether an operational constraint is satisfied; and (d) modify network traffic to and/or from the at least one industrial machine based on the determination in step (c).

DETAILED DESCRIPTION

Figure 1:
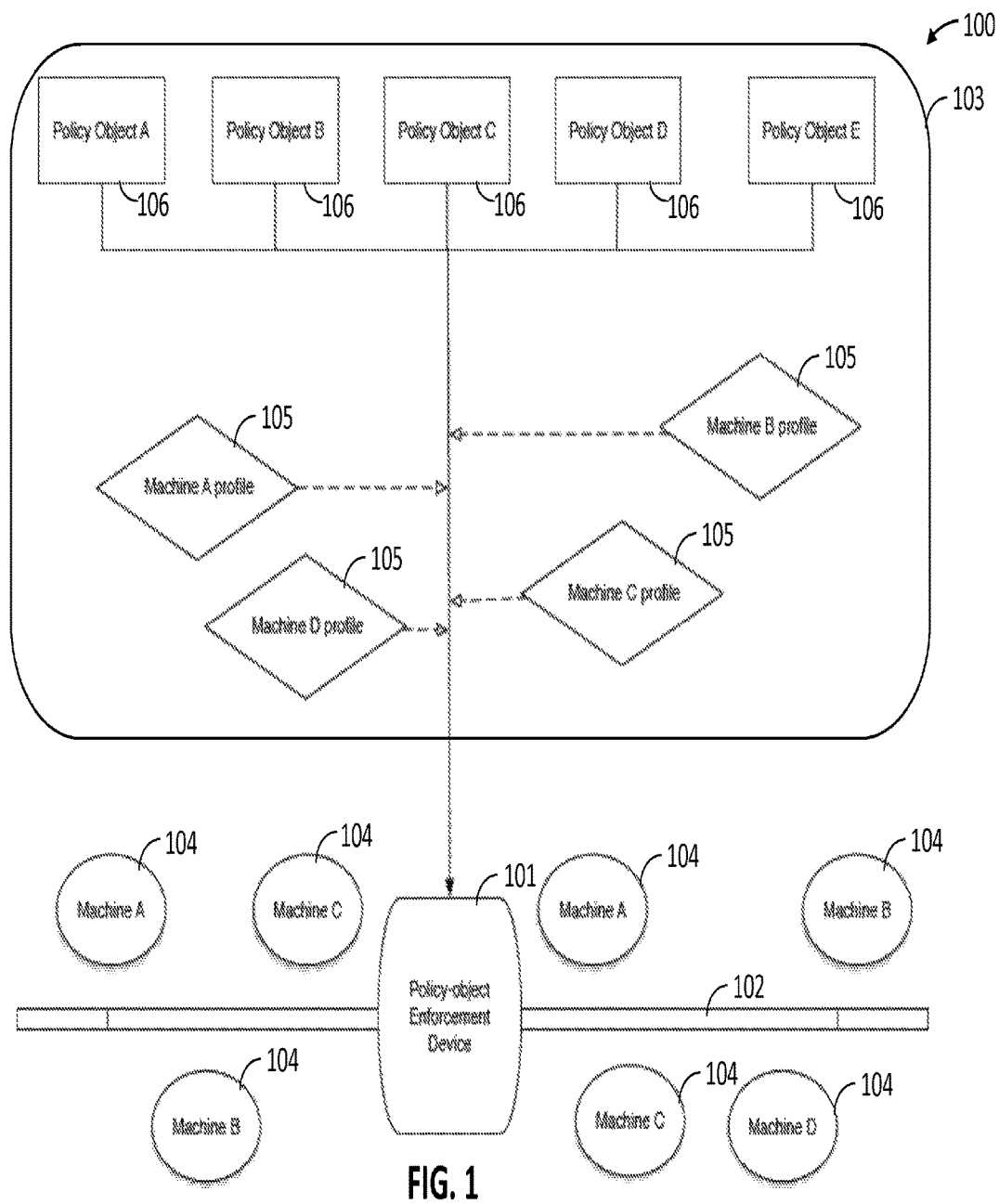
FIG. 1 illustrates a converged network employing a policy regulation scheme consistent with one exemplary embodiment of the disclosure.

Considerable evidence exists to support the view that, in current practice and prior art, there is very little ability to filter specific types of machine behaviors in terms of the behaviors themselves—for example, ensuring that machines will or will not perform specific functions or operate at particular rates, speeds, temperatures, etc. at any given time, or given the behaviors and operating characteristics of nearby machines.

Specific machines can presently send and receive, over a network, control signals and telemetry using vendor-specific or otherwise narrowly-defined control languages. However, embodiments of the present invention permit operators of machines or processes to define policy objects, or rules governing the functions of machines and processes, in more general terms, and enforce these more general policies automatically with a network device that both adapts the abstract policies to specific machines (according to machine-specific profiles or translations), and also filters the network communications to those machines. These general policies abstract the functioning of specific machines, thus enabling a far more manageable and scalable approach to managing industrial machines, in terms of the behaviors of the machines themselves, and not just for protection against attackers present in the converged network.

Another problem in converged networks arises from the radically different ways that computers and industrial machines respond to delays or other temporal inconsistencies in network communications. Computers are designed to tolerate small delays well, whereas machines often have little to no tolerance for variances in latency or jitter beyond extremely narrow ranges.

Embodiments of the present invention employ a network device positioned inline with network communications in a converged network to enforce rules regarding tolerated latency or jitter, by recognizing both the types of devices that are communicating on the network, as well as the specific nature of the communications itself.

These advantages extend still further when machines communicate with other machines in converged networks, to extend control signals and telemetry which may or may not have the effect of modifying the behavior of other machines. The problem of regulating such communications, whether they take place on a small or large scale (specifically, within one industrial plant or location, or across multiple locations linked by Ethernets or WANs), is of extreme importance in assuring safe and efficient operation.

Embodiments of the present invention permit the expression of both functional commands and operational constraints on machines in an abstract language, not the ones associated with specific machines, with enough mathematical precision to permit algebraic conflict resolution, and implement the commands and constraints in a network device that has the ability to automatically translate and filter communications to and from specific machines. The goal is to target and control specific machine behaviors through a general language which admits automatic translation into the language of specific machines.

Embodiments of the present invention provide network firewalls that include the capabilities described above.

Embodiments of the present invention employ implement the general policy language, together with machine-specific profiles, directly in industrial machines ("embedding"). Such embodiments are desirably implemented in terms of gate-array logic, rather than traditional software running on a general-purpose processor or CPU.

One embodiment of the current invention is an automatic system that can provide security, enforce safety and efficiency rules, and cause machines to execute arbitrary functions, in response to policy objects expressed in an abstract but mathematically precise language, using devices that are either deployed in Ethernet networks or embedded directly in industrial machines.

Fundamentally, certain embodiments of the invention inspect electronic communications (control signals and telemetry) between and among industrial machines, and between and among industrial machines and traditional computers; applying to those communications a number of policy objects which are written in a mathematically-precise control language that can express multiple levels of operational constraints and required behaviors; in some embodiments, allowing, blocking, or modifying communications depending on the disposition of the control-language analysis; in other embodiments, reporting to operators or automatic analysis systems the presence of communications depending on the disposition of the control-language analysis.

An exemplary embodiment of the invention will now be described in further detail with reference to FIG. 1, which illustrates a converged network 100 employing a policy regulation scheme consistent with one exemplary embodiment of the disclosure. Network 100 includes a policy-object enforcement device 101 that may be deployed in a communications network and/or embedded in a machine and is configured to implement an abstract but mathematically-precise language for expressing desired machine behaviors and operational constraints. Device 100 is coupled via one or more wired and/or wireless networks 102 to a plurality of industrial machines 104 (in this example, machines of three different types: Machine A, Machine B, and Machine C). Device 100 is in communication with one or more storage devices 103 that contain one or more software-based "profiles" 105, which convert the abstract language into control signals, telemetry, API calls, or other controls germane to Machines A, B, and C, respectively, to any degree of granularity. Storage devices 103 also contain "policy objects" 106 (in this example, Policy Objects A-E) created using a control language that permits the policy objects to have any size and complexity, thereby allowing the expression of constraints and desired behaviors of arbitrary controls. Device 100 intercepts or otherwise inspects network communications to and from industrial machines 104 and filters, modifies, and/or blocks network traffic according to the machine-specific profiles 105 and/or the abstract rules of policy objects 106.

The control language used in this embodiment to create policy objects that allow the expression of constraints and desired behaviors of arbitrary controls may have some or all of the following properties:

The control language may be constructed as a series of logical predicates against "controls," which are arbitrary elements taken from any physical domain, such as manufacturing cell zones, chemical processes, electrical substations, computer networks, or even information-retrieval systems.

The various controls have well-defined intrinsic properties that are defined by the control language. These properties can represent physical attributes such as the temperature, pressure, speed or voltage at which a machine is operating at any given time; qualities of a data-system transaction such as session metadata, command words, and command parameters; and qualities of a large scale physical process such as the number of automobiles being manufactured per hour in a plant.

In the control language, values for the various controls stand in logical relationships with each other that, taken together, express an overall set of constraints on the behavior of a large-scale system; or specify behaviors and actions to be taken by machines under particular conditions; or both.

The control language has enough mathematical rigor to enable: 1) automatic detection of control statements which conflict with other or cannot simultaneously be true; 2) expression of conditional statements of arbitrary complexity; 3) the maintenance of dynamic state.

In operation (when embodied in an appropriate device as described below), the control language executes policy objects by evaluating the predicates for each of the controls appearing therein, substituting for each controlled property a value retrieved dynamically, either from a real time environment, or from a time-series of values recorded previously. Taken together, the logical values computed for each predicate appearing in the policy object produce a "disposition" which may serve as the input for a physical control system or reported to an analytics-processing system, or both.

Examples of dispositions would be to permit or deny a requested control signal dispatched to a machine through a network; to move an actuator arm or a conveyor belt; or to supply more or less power to an electrical grid. It should be observed that the "granularity" of the dispositions is arbitrary, ranging from very localized (perhaps to control the behavior of a single machine) to the very large scale. This is a property arising from the nature of the controls, which may refer to any dynamically observable property, whether large-scale or small-scale.

The control dispositions of policy objects can be used as "building blocks," serving as the observational input to other policy objects, possibly being carried over a communications network to effectuate such a model across a number of different machines.

Examples of the policy objects in the control language include the following:

Example A: Stateful and Conditional Controls

```xml
<?xml version="1.0"?>
<p:policy-object xmlns:p="http://bayshorenetworks.com/policy-regulation-
language/2014" policyname="segregate-client-data" uuid="cbdf9064-
3ab711e4a2be0800276380c2">
   <p:condition label="detect smb/cifs" control="protocol" op="=" value="smb-cifs" >
      <p:condition label="detect confidential indicator" control="content.regexscan" op="~"
value="(?i)supersecret-client-A" >
         <p:rule label="set confidentiality indicator on session" verb="set"
control="session.variable" parameter="$confidential" value="true" />
      </p:/condition>
   </p:condition>
   <p:condition label="detect http" control="protocol" op="=" value="http" >
      <p:condition label="detect if confidentiality indicator is set on session"
control="session.variable" parameter="$confidential" value="true" >
         <p:rule label="disallow client B website" verb="deny" control="http.request.host"
op="=" value="clientb.mycompany.com" />
         <p:rule label="disallow client C website" verb="deny" control="http.request.host"
op="=" value="clientc.mycompany.com" />
</p:condition>
   </p:condition>
</p:policy-object>
```

This example illustrates conditionality and stateful behavior in the control language, which are important characteristics of certain embodiments of the invention. It should be observed that the control "protocol" is used in two conditional statements in the language. These conditional statements examine the value of the "protocol" control which is returned by the runtime environment. The additional control-language statements contained inside the conditionals are executed whenever the conditional statement evaluates "true." In this example, the statements inside the conditional labeled "detect smb/cifs" are evaluated for network flows in which the protocol is determined dynamically to be SMB or CIFS (a protocol typically used to access files on file servers). The statements inside the conditional labeled "detect http" are evaluated for flows in which the protocol is determined to be HTTP.

The statement inside the "detect smb/cifs" conditional should also be noted. It evaluates the control "content.regexscan," which logically applies a regular-expression match to the contents of a file which was transferred via the SMB or CIFS protocols. (The value "~" given in the "op" attribute of the rule denotes a regular-expression match anywhere within the inspected file content. Other operators are defined as appropriate.) The action of the statement is to set the value of a session variable named "$confidential" whenever content is transferred by a user that contains a match for the regular expression "(?i)supersecret-client-A".

Next, the rules contained inside the conditional "detect http" should be noted. There is a conditional labelled "detect if confidentiality indicator is set on session," which evaluates to true if the value of the session variable "$confidential" is true. This will be the case if a particular user has previously accessed a document from a file share containing text or metadata which matches "supersecret-client-A". In this case, there are two rules which will be applied to that user, and they will act to prevent her from accessing websites named "clientb.mycompany.com" and "clientc.mycompany.com".

The scope of this policy object is important to understand. The concept of a "session" is disclosed herein. The policy object operates on a logical transaction as detected and parsed within a set of network communications. In this example, the transactions of interest are accesses to files on file-servers; and accesses to corporate websites. It should be observed that, although the policy is applied to network communications by a device located in a network, the controlled transactions themselves are not necessarily defined with reference to any particular network locations or communication details, as is generally the case in devices known as "firewalls." Rather, the boundaries of the transactions of interest are defined in the controls themselves.

To clarify, the example above uses the control "content.regexscan." The first of these refers to any discrete element of content (such as a document) which is meaningfully transported over the network and visible to the embodiment of the invention. A "regexscan" applied to that content is a search for a regular expression. The rest of the rule is a predicate applied to the value returned in any particular transaction by the regexscan operation. The predicate produces a DISPOSITION, (in this case either an allow or a deny, or equivalently a boolean truth-value), which then determines whether the control-language statements within the conditional will execute, within the context of that particular session.

Similar comments apply to the control "http.request.host." This is a much more specialized control than "content.regexscan," in that it narrowly denotes the Host header contained in an HTTP request. This control therefore is only meaningful when an HTTP request is detected in the network traffic. (Embodiments of the invention therefore parse and detect the transactions implied by the various controls that are defined for various applications.)

But it should be observed that the control that inspects documents has an impact on the control that inspects HTTP requests: this takes place through the "session variable" named "$confidential." The specific scope of the session is determined, depending on application. In this case, it is useful and logical for that scope to be the set of all network accesses initiated by specific machines or computers, as identified by either a network address or user-session metadata; or more generally by a vendor or machine type.

Example B: Enforcing Allowed Transactions

```xml
<?xml version="1.0"?>
<p:policy-object xmlns:p="http://bayshorenetworks.com/policy-regulation-
language/2014" policyname="robot-control" uuid="cbdf9064-
3ab711e4a2be0800276380c2">
<p:rule label="allowed protocol" control="ipv4-protocol"
uuid="d84f166e560e11e3949d0800273a32bd" value="robot-rpc" verb="allow" op="=" />
<p:rule label="allowed addresses" control="ipv4-source-address"
uuid="056f4b583ab811e4a2be0800276380c2" value="192.168.0.0/24" verb="allow"
op="=" />
<p:rule label="allow rpc calls 100 or greater" control="robot-rpc-txn" value="100"
op=">=" verb="allow" uuid="7f521efa-3ab8-11e4-a2be-0800276380c2" />
<p:rule label="allow rpc calls less than 150" control="robot-rpc-txn" value="150"
op="<" verb="allow" uuid="887484b4-3ab8-11e4-a2be-0800276380c2" />
</p:policy-object>
```

In this example, the control language is being executed by a network device that reads streams from a network, following the general pattern of a blocking firewall. This policy object has four rules marked with the verb "allow," referencing three different controls. As the device inspects and parses the data flowing through the network, it determines (for each network flow) whether the data in the flow conform to the "robot-rpc" protocol. (Different embodiments of the invention may support any communications protocol(s) that are appropriate and meaningful for their applications.) Because the verb in the rule is "allow," any network flow that is not dynamically recognized as comprising syntactically-correct robot-rpc data will be rejected (dropped) by the network device, which thus acts as a content-aware firewall under the direction of the policy object.

In addition to the protocol rule, this policy object also contains a rule which rejects any network traffic not originating from a source IP address in the network range 192.168.0.0/24. More significantly (in terms of policy regulation), the next two rules reference the control "robot-rpc-txn," a reference to transaction numbers contained in typical RPC languages. These two rules together enforce that only RPCs with transaction numbers in the range >=100 and <150 should be transmitted by the network device which enforces the policy.

In this example, the "label" attributes in each policy rule are for self-documentation and logging; while the UUID numbers uniquely identify the policy and each rule in a large-scale system in which many hundreds or thousands of similar policy objects are deployed together. The latter feature desirably enables automatic conflict detection and (where possible) resolution in large-scale systems, where policy objects may be developed by many different people over long periods of time.

It should be observed that the goal of a policy object like this, as applied to controls signals electronically communicated to a robot, is to ensure safe and efficient operation of the robot.

Example C: Machine Control Policy

This is an example of a policy object that illustrates operational constraints on machines. The conditional labeled "Manufacturer M centrifuges" is true whenever the control "centrifuge-model" evaluates to one of the values "6000 series," "7000 series," or "8000 series." Clearly, in this embodiment of the invention, a way of obtaining a meaningful value for this control should be obtained. It should be observed, however, that the structure of the control language remains uniform and consistent despite the considerable difference in abstraction levels between this example (which refers to machine characteristics) and that of the preceding examples (which refer to values obtainable by parsing network flows).

Continuing the example, it can be seen that, for Series 6000, 7000, and 8000 centrifuges, a motor speed of at most 8000 RPM will be enforced. Additionally, it might be desirable to report (perhaps to a historian or analytical database) whenever machines of this type are supplied with a voltage exceeding 480 volts.

Dynamic values for the controls "motor-speed" and "supply-voltage" should be obtained, but how to obtain those values is not necessarily evident. Means of obtaining those values could be varied and may include, e.g., using a sensor embedded in the centrifuge itself and connected to a similarly-embedded system in one embodiment of the invention; or a telemetry parser inside a network device; or a database of historical values for centrifuge motor speeds; and so forth. Embodiments of the invention distinctively provide a mechanism for incorporating the additional ("multi-layer") controls employed to bridge the layers of abstraction between this example of the control language, and the actual controlled values. This mechanism is disclosed below in the section "Multilayer Policy Objects."

An operator of centrifuges from Manufacturer M may wish to control the functioning of the machines, and to describe those controls in a clear and precise way. These controls are in the nature of governance and safety rules, and in general they change only infrequently. However, the specific models of machines subject to these controls, and

```xml
<?xml version="1.0"?>
<p:policy-object xmlns:p="http://bayshorenetworks.com/policy-regulation-
language/2014" policyname="centrifuge-control" uuid="cbdf9064-
3ab711e4a2be0800276380c2">
<p:condition label="Manufacturer M centrifuges" control="centrifuge-model" op="one-
of" value="6000 series|7000 series|8000 series" >
  <p:rule label="max motor speed" control="motor-speed" verb="allow" op="<"
value="8000" />
  <p:rule label="report over voltage" control="supply-voltage" verb="report" op=">"
value="480" />
</p:/condition>
</p:policy-object>
``` the specific control systems, sensors, and telemetry of the machines change far more often. This gap between abstraction layers is an enormous problem in the practice of policy regulation for industrial machines and processes. The multilayer policy objects provided by embodiments of the present invention bridges the gap.

Example D: Firmware-Attack Prevention

```xml
<?xml version="1.0"?>
<p:policy-object xmlns:p="http://bayshorenetworks.com/policy-regulation-
language/2014" policyname="protect-firmware" uuid="e5ce3198-6645-4485-baae-
be80803ba3bb">
<p:condition label="detect vendor R plc" control="vendor-R-plc" op="*" value="">
   <p:rule label="" control="content-yarascan" verb="deny" parameter="malware-
signatures.yara" op="=" value="true" />
</p:condition>
</p:policy-object>
```

This is an example of a policy object that protects "intelligent" electronic devices (in this case, PLCs from Manufacturer R), from being infiltrated with malware during a "flash" update of the firmware on the devices. In this case, the control "vendor-R-plc" is implemented in quite a broad way, to detect any content being transferred to and from any of Vendor R's PLCs, as determined in the network traffic. In one embodiment of the invention, a network device that implements this policy may be a customized device purchased from Vendor R and containing proprietary mechanisms for detecting both the presence of that vendor's devices on a network; and for determining the boundaries of content transferred on the network to and from the devices. In other words, a proprietary network communications protocol is in use, which is supported by embodiments of the present invention through the mechanism of custom "profiles," which specify both the syntax and the semantics of the network communications that may be encountered by a particular application, in different embodiments of the invention. It will be seen that the construction of such protocols may be done in the same control language that has been discussed above. Through its mathematically-precise predicate structure, the control language is capable of expressing new varieties of electronic-communications syntax (protocols), as well as new controls (semantics).

As an example, the additional control "content-yarascan" applies a collection of signatures in the Yara language, for purposes of detecting malware. When this control is applied to the communications to and from Vendor R's PLCs, a search for malware is performed, and, if malware is found, communication to and/or from the device is aborted.

Example E: Process-Control Policy

This example captures a very high-level policy expressing a safety constraint in a chemical-production process. The policy states that if ethylene-feedstock flow falls below a certain range (10,000 pounds per hour), then toluene production should not be permitted to rise above 400 lbs/hour.

This is an example of policy regulation in-the-large, which is enabled by the multilayer structure of the control language in embodiments of the invention. A number of different policy objects exist, all inspecting network communications among sensors, machines and computers within a chemical-production plant. Each policy object is written specifically to interact with the machine-to-machine communications of particular devices, but the dispositions (policy outcomes; for example, allow/deny or set a state variable) are made available to policy objects at higher levels.

In this example, the controls "feedstock-ethylene-flow" and "toluene-production-rate" are composite controls constructed from other controls, e.g., in the form appearing in the preceding examples. They are made available to the "process-constraints" policy object through the process of inclusion. (Note the two p:include statements, which refer to policy objects identified by globally-unique identifiers.)

Embodiments of the invention make this kind of policy-management in the large convenient and manageable, through the mechanism of abstraction at multiple layers. It might not be practical for people at the level of overall plant and process management to understand the operational complexities of the equipment and network architecture of a plant. Neither is it practical for people with detailed knowledge of the specific machines and networks to have the knowledge needed to make overall production decisions. Yet a third knowledge, the orthogonal knowledge domain, is employed to determine safety policy for all of these interconnected machines and processes, quite apart from the business decisions made by the plant's managers as they determine how much to produce and when.

Embodiments of the invention support the independent creation of policy objects operating at each level or knowledge domain, and automatically synchronizes them math-

```xml
<?xml version="1.0"?>
<p:policy-object xmlns:p="http://bayshorenetworks.com/policy-regulation-
language/2014" policyname="process-constraints" uuid="7a44aa40-7a8c-4f76-ad37-
6102cbc9e5cc">
<p:include label="ethylene-controls" policy-uuid="0d3f9a1e-3faf-4739-a94e-
a2e6bdd9ff53" />
<p:include label="toluene-controls" policy-uuid="402324da-5802-4a7d-8bd3-
477c6f7d8842" />
<p:condition label="feedstock flow rate" control="feedstock-ethylene-flow" op="<"
value="10000" >
   <p:rule label="toluene production" control="toluene-production-rate" verb="deny"
op=">" value="400" />
</p:condition>
</p:policy-object>
``` ematically, so that the outputs from various policy objects become the inputs to policy objects at different levels of abstraction.

In certain embodiments of the invention, an extensible control language allows for easy extension via the definition of new controls and new disposition types. This feature enables an overall policy-regulation framework based on this language to evolve gracefully over time, with the addition of new capabilities and new machine types that do not disturb the fundamental structure of existing policies or interfere with existing controls.

In certain embodiments of the invention, a multilayer policy object framework permits the expression and regulation of policy for operating machine processes at any scale, from individual devices such as robots or pressure vessels, to complex systems such as jet engines, to entire large-scale systems such as the electrical grid. This quality arises from the multilayer design of the control language.

To achieve its fundamental multilayer character, the control language permits the definition of "metacontrols" that are defined in terms of other controls, or indeed of entire policy objects. This solves a very challenging problem in the policy-regulation of industrial systems "in the large," which is the difficulty of enforcing controls and intended behaviors at a high level, on devices that have very detailed and machine-specific control languages.

In certain embodiments of the invention, a processing device may be, e.g., a general-purpose computer (either virtual or hardware), or a network device, or an embedded device. The processing device may include components such as protocol parsers and sensors to dynamically recover the values of controls appearing in the policy objects expressed in the control language.

Embodiments of the invention may be implemented, e.g., in network devices, network-capture processors, and embedded devices, as will now be discussed in further detail.

Embodiments of the invention can be implemented as a network device, which can be a general-purpose or special-purpose computer, either in a ruggedized or non-ruggedized package. In this general type of embodiment, the invention has one or more Ethernet interfaces to permit inline operation with network communications to and from machines and computers; or alternatively on a network "tap," so that it can see and analyze copies of subsets of the traffic contained in a network. The language-based policy objects that the network device works with may either be configured statically into the device; or retrieved automatically through a "management plane," which generally is a network connection to a computer or computers acting as a policy repository.

In this type of implementation, embodiments of the invention can block or modify network communications according to the dispositions produced by the policy language. For example, control signals to a machine may be disallowed if deemed unsafe or deemed to violate business rules; and/ telemetry to network endpoints deemed unauthorized or in an unsafe part of the network can be blocked.

In a second general type of implementation, embodiments of the invention can be supplied as software operating on captures of network traffic. In this case, the typical objective is to obtain forensics or other insights into an industrial process through analysis of historic data.

A third general type of implementation is to embed a processing device, such as a field-programmable gate array, directly into an industrial machine. This embedded device is programmed to be able to execute the policy language, and to obtain (via flash updates) new policy objects. In this case, manufacturers of industrial machines can encode safety and operational-efficiency constraints, as well as telemetry feeds, directly into their devices. Because of the multilayered nature of the invention's control language, the dispositions generated by the embedded device can be communicated via an Ethernet to other policy-enforcement nodes, and take part in an in-the-large policy regulation scheme.

One exemplary embodiment of the invention operates as a SCADA firewall. The SCADA firewall is a network device deployed inline with control signals transmitted over a network between a control application running on a standard computer, and an industrial robot performing assembly-line functions. In this embodiment, the desired policy regulation is to enforce a "read-only" posture. Remote operators are prevented from commanding the robot to perform functions or to change its configuration, but they are permitted to read diagnostic registers or other status of the robot. The network device parses the network communications to and from the robot, discerns which requested functions are "reads" and which are "writes," and transmits the former while inhibiting the latter.

The SCADA firewall described in connection with this embodiment analyzes the semantics, or behavior contained within the network communications. Based on the semantic analysis which is discovered in real time by the SCADA firewall through direct analysis of the network traffic, specific transactions requested by the control system may be allowed, rejected, or allowed with modifications by the SCADA firewall.

Another embodiment of the invention operates as a SCADA firewall, with all of the functions described above, but also incorporates access-control features typically found in network firewalls. These additional filtration modes enhance the value of the behavior filtration by allowing a policy-writer to selectively permit behaviors on the basis of session metadata. For example, "writes" may never be performed against the robot. "Reads" may be performed only by authorized users, or from specific network segments, or at certain times of day.

Unlike the prior art, in embodiments of the invention, filtration based on behavior is augmented with policy rules specifying session metadata including information about the users or endpoinsts, network location, environmental factors, etc. The session metadata may be discovered dynamically by the augmented SCADA firewall (by analysis of the network traffic to and from the robot), or it may be configured statically, or discovered through communications on a separate management network ("control plane").

Another embodiment of the invention operates as a policy regulator for the so-called "Internet of Things." In this embodiment, the invention is implemented as a network device installed in a large-scale enterprise network or in a portion of the Internet. The device has visibility to traffic to and from industrial machines or such devices as automobiles, refrigerators, handheld devices, which are connected to the network through a switch, router, or gateway device. The policy regulator parses all the network traffic that it sees, looking for specific transactions (including control signals and telemetry) to and from any or all of the network-enabled machines using the network. Based on the policy objects that are encoded by its local administrators, the device can filter, modify, report on, or disallow any transaction that it sees.

A principal feature of embodiments of the invention is content-level filtration that is aware of data ranges and set points. Although standard network firewall technology can filter addresses and ports, and even has some awareness of protocols, there is no protection against semantic errors or attacks.

As computer usage moves from isolated network types like CAN and DeviceNet, to Ethernet, this brings integration with every other network (notably producing the "Internet of Things"), but exposes equipment to a much broader array of potentially bad actors.

For applications relating to the "Internet of Things," HTTP traffic may be filtered. For industrial automation and control applications, one or more other protocols and/or standards may be employed.

A principal feature of embodiments of the invention is a language-based system for protecting transaction semantics as applied electronically to machines or automation equipment. This can be embodied in network devices or embedded. This includes custom language processors for defining new protocols (syntax) as well as new semantics.

A principal feature of embodiments of the invention is the idea of a "protective blade," a language-based policy object that can be uploaded to a device embodying appropriate processing software or firmware.

While prior art exists around proprietary protections for machines, there is no conventional language-based protection that can be enforced in a network device or onboard in proximity to a network connection.

In one embodiment, language processors are used for a variety of different machines and process types. These are software programs contained in the network or embedded device. Having multiple processors for different machines and different vendors permits a standardization process that leads to global policy regulation.

In one embodiment, the language can be expressed in high-level terms and then compiled to work against the network flows.

In different embodiments, network processors, as well as forensic processors (working off network captures), as well as testing and development devices that use statically generated context may be employed.

Principal features of embodiments of the invention include: combining a dynamic context (making available session data as well as content), with a policy object in language form, with a processor that applies the policy objects against each discrete transaction that is detected in the dynamic context and can produce a variety of dispositions.

The three principal features of embodiments of the invention discussed briefly above will now be described in additional detail.

Policy Language

The first principal feature is the policy language, which may be constructed from scratch or as a "schema" or instantiation of any of the variety of existing artificial languages designed for the purpose of capturing predicate logic. Such artificial languages enabling the construction of a policy language for the current invention include XML, various languages used for constructing ontologies, or domain-specific languages (DSLs) constructed within general-purpose programming languages such as Python or Ruby.

It is not necessary that policy language itself be human-readable. Depending on implementation, the language may be a purpose-built binary representation analogous to the "bytecodes" or "machine languages" used by virtual or hardware CPUs. In this case, some form of software tools are desirably constructed to allow objects built in the policy language to be viewed and edited by humans.

Controls:

The policy language is capable of expressing arbitrary assertions of values of attributes, measurements, properties, or characteristics. The items that form the subject of value-assertions in the policy language are called "CONTROLS" and generally represent measurable or observable properties of machines, processes, or other aspects of the real world.

Controls may be defined to any degree of abstraction, e.g., from the very large-scale (meteorological readings for a city; total reactive power delivered by an electrical grid), to the medium-scale (fluid-flow rates in an oil refinery; value-at-risk in a financial-asset trading system), to the very granular (temperature of a reactor vessel; IP addresses in a network).

The policy language provides a mechanism of data-typing for each control, which may be hard-coded in particular implementations; configurable by system operators; or a combination of both. The data type given for each control defines the range and format of the data values which the control may take on at various times during dynamic operation of the invention. The data types also define semantics for each control, including the arithmetic, logical or string operators which may be applied meaningfully to dynamic values of the control, such that dynamic values of the control may be compared with pre-configured ranges; and such that values of different controls obeying compatible semantics may be compared with each other. (The latter feature enables automatic resolution of conflicting policy rules.)

Fundamental Data Types:

Examples of fundamental data types which may be applied to controls include: ASCII-coded character strings of specified lengths; integral or floating-point numbers of specified maximum and minimum range; and qualitative sets of mutually-exclusive attributes like color-lists.

More complex and abstract data types may also be implemented by combining two or more of the fundamental data types; or by writing custom software codes to reflect the characteristics of specific controls in particular processes or machines.

The following are two examples in XML of the definition and data-typing of controls. One relates to the outcome of HTTP (web-browser) transactions, and one relates to position data for a multi-axis robotic arm. It is noted that the data type is captured in the "comparator" field.

Example 1

```
<p:control name="http.response.status">
    <p:comparator>unsigned-integer-32 {100:599}</p:comparator>
    <p:parameter>none</p:parameter>
    <p:description>
    <![CDATA[
    In HTTP/S flows, this control returns the HTTP status code returned
    from the back-end HTTP server. The range is a three-digit integer
    between 100 and 599.
```

-continued

```
This control can be used in conditional expressions to
modify server responses based on whether the server reported an error
or not.
With non-HTTP flows, the control returns nothing.
The data type of this control is a 32-bit unsigned integer ranging from 100
599.
]]>
   </p:description>
</p:control>
```

Example 2

```
<p:control name="robotarm.position">
    <p:comparator>ieee-754[6]</p:comparator>
    <p:parameter>none</p:parameter>
    <p:description>
    <![CDATA[
      Express the position of a six-axis robot arm as an array of floating-point values.
    ]]>
    </p:description>
</p:control>
```

Predicates:

The policy language supports "PREDICATES," which are statements of the values that a control may dynamically assume, expressed as boolean truth-values. The intent is to allow the computation of a truth-value for a given predicate at an arbitrary point in time.

The following are two examples of predicates expressed in XML:

<p:predicate control="http.response.status" operator="=" value="200"/>

<p:predicate control="robotarm.position" operator="!=" parameter="x-axis" value="500.0"/>

As can readily be seen, the action of predicates is to express conditions against which the dynamic or instantaneous values of particular controls may be meaningfully compared (with the semantics of the comparison being controlled by the specific data type of the control), and a boolean (True/False) value may be computed. As will be seen next, this computed boolean value is used in conjunction with the computed values of other controls to produce an instantaneous disposition, or policy outcome.

With reference to these examples, the value of a predicate expressed against a control representing an HTTP response status-code is meaningfully determined for each occurrence of an HTTP transaction which may be detected in a network. The value expressing the position of the X-axis of a multi-axis robotic arm is meaningfully determined through periodic or event-driven automatic measurement.

The examples above show predicates expressed in terms of unchanging values that appear directly in the language expressing the predicate. It may be useful to express predicates in which the instantaneous value of the control is compared with the current value of other controls, or with dynamic state values that may have been computed at some earlier point in time and stored in a device embodying the invention.

Logical Operations:

The policy language supports logical operations, including conjunction and disjunction, so that the boolean truth-values computed dynamically from predicates may be combined arbitrarily to produce truth-values dependent on any combination of: instantaneous predicate values; stored state; or preconfigured static data.

Dispositions and Rules:

The policy language supports DISPOSITIONS, which are the specifications of actions to be taken upon determination of the truth-value of any particular predicate or logical combination of predicates. Dispositions may be any action at all which is relevant in the deployment context of the particular application.

The combination of a predicate defined against a particular control, with a disposition that is effectuated when the predicate produces a logical value of TRUE, is termed a RULE. Rules may be combined with each other in conditional statements and other logical combinations. A set of rules intended to be evaluated and executed together at a specific point in time within a specific dynamic context, forms a POLICY OBJECT.

For example, a policy engine in one embodiment of the invention applied to the control of Web (HTTP) transactions may choose to block or rewrite the contents of a transaction in which the HTTP status response-code is observed to represent a server-error condition.

In another example, a policy engine in one embodiment of the invention applied to telemetry feeds from robots may choose to report an exceptional condition, possibly necessitating maintenance, to a system-logging or event-alerting facility, when a robotic arm is observed to be hyperextended along a particular axis (that is, the value for one element of an arm-position control exceeds a safe value encoded in a predicate of the policy language).

Policy Objects:

The policy language supports the creation of "POLICY OBJECTS." A policy object, as described above, is an ordered list of RULES (statements comprising a predicate and a dispositions), suitable for automatic parsing (see below) and automatic execution within a dynamic environment such as a network element or device, or a processor embedded within a machine.

A policy object may contain any number of predicates and dispositions. Multiple predicates within a policy object may refer to the same control, in which case well-defined rules for logical combination (including conjunction, disjunction, and exclusive disjunction) are automatically applied. Embodiments of the policy language may also support automatic disambiguation for predicates that contain mutually exclusive values, or for predicates that, when taken together, express conditions that violate some external condition. (An example of the latter would express the condition that an assembly robot may not be operated while the door to its safety cage is unlatched.)

Inclusion and Combination:

The policy language supports INCLUSION and/or COMBINATION. Inclusion occurs when a policy object incorporates another policy object by referring to it by name. Combination occurs when two or more policy objects are joined together to form a composite policy object which is parsed, disambiguated, and executed as a single unified whole.

Machine Profiles and Metacontrols:

The policy language supports the creation of "MACHINE PROFILES," which are simply sets of controls that are relevant to specific machines, classes of machines, machine vendors, or processes. Machine profiles may contain ordinary controls (consisting of a uniquely-defined name; a data-type; and other descriptive information); or metacontrols (see below); or a combination of both.

The policy language desirably contains an extensibility mechanism to allow machine profiles to be added independently of the main development of the policy language. This supports the expected usage pattern that makers of specific machines will create profiles for their own machines, which will be made available as add-ons (possibly at extra cost) to users of embodiments of the present invention.

The particular value of the machine profile is to isolate the operational particulars of a machine or class of machines from how the machine receives commands and sends telemetry on a network.

For example, a network-capable torque tool from a specific vendor may send and receive data using a communications protocol such as a Modbus/TCP or Ethernet/IP. A policy designed to regulate the behavior of such a device may contain predicates and dispositions that control specific data fields within Modbus/TCP or Ethernet/IP transactions to and from the torque tool, as the transactions are observed on a network. Such transactions typically encode commands or operational measurements pertaining to the tool in specific locations within a data record (for example, the Modbus command "Write such-and-such a numeric value to Register 100" may have the effect of setting the torque-level for a specific operation within the torque tool).

However, it is more preferable to express such behavioral controls in terms of the commands and operational characteristics of the device itself, rather than in terms of how these commands and characteristics are communicated in a network. It makes much more sense for a machine vendor or process manager to express constraints on a torque tool in terms of the tool's torque level (e.g., "never exceed 10 lbs. force when working on a particular aircraft part"), rather than in network terms (e.g., "never allow Modbus Register 100 to be written with a value larger than 10.0").

It is the purpose of a METACONTROL to encode what is in essence a mapping between knowledge of a class of machine behaviors (such as the force levels in a torque tool) and knowledge of some behaviors appearing within network communications. Significantly, in embodiments of the invention, the policy language allows for the capture of such mappings. The structure of controls, predicates, and logical combinations thereof makes such mappings straightforward. For example:

<map modbus register 100 to Vendor A torque tool force level>

In this example, the appearance of predicates referencing a control that denotes a torque-tool's force level will, in the dynamic execution context, be translated to an observation of a Modbus register value in the actual network communications.

The METACONTROL is a distinctive and desirable feature of the policy language because it solves the problem of managing policy outcomes at scale, across a spectrum of object granularities. A metacontrol is a control whose dynamically-determined value is another control, set of controls, or even an entire policy object. Predicates and dispositions can be specified for metacontrols just as easily as they can for ordinary controls.

In a dynamic execution environment, the value returned by a metacontrol might not necessarily be observable in the immediate execution context and may need to be retrieved from a database or from another location in a network. In this way, a "meta-policy" potentially spanning an enormous amount of cyber and process space (encompassing not just industrial plants but also cities, regions, and countries) may easily be constructed and managed, and executed uniformly at a very large number of network nodes within the space.

Policy-Object Processing Software

The second principal feature of embodiments of the invention is a software module that can parse and process policy objects written in the policy language, e.g., as detailed above. The purpose of the parsing software is to convert, or "compile," policy objects into a form that may be consumed directly by the dynamic execution context (detailed in the next section).

The specific type of language parsing will be dictated by the choices made by the implementer when constructing the policy language. If a custom text-based language or bytecode is developed, then a parsing software may be purpose-built, e.g., using conventional tools, such lexical analyzers, parser generators based on context-free grammars, and the like. If a policy language is developed as a schema in an ontology language or a representational language such as XML, or as a DSL in a conventional programming language, then the implementer will have a clear choice of conventional parsing tools to use in processing the policy objects, generally provided as part of the ontology, representational, or programming language.

The outcome of the parsing and compilation process is the generation of a set of commands expressed in the native language of the dynamic execution platform, which, as noted above, may be, e.g., a conventional computer, a specialized network element, or an embedded device in a machine.

The general structure of the parsed and compiled policy object reflects the organization of the policy language into controls, predicates, dispositions, metacontrols, inclusion and composition.

Logically, each statement in the policy language represents the computation of a predicate against the dynamically-observed or pre-configured value of a control. The computation results in a boolean truth value, which can be combined with other predicate truth-values through logical operators (including conjunction, disjunction, negation, and exclusive disjunction) to produce dispositions.

The processing of predicates proceeds until a final disposition is determined. This may involve inspecting all of the predicate statements (RULES) present in the policy object, or only a subset (if a final disposition can be determined without inspecting all of the rules).

The implementer of the policy language may define any number of possible dispositions. A basic set of dispositions may include, e.g.: DENY (prevent a transaction from taking place by blocking a network communication or by directly controlling a machine); ALLOW (permit a transaction to take place); MODIFY (change one or more of the parameters or data elements in the transaction before passing it on in the network or to the control system of a machine); REPORT (issue an event to a historian or event-logging or alerting system about some perhaps exceptional, disallowed, or unsafe combination of observed behaviors); and SET (add a data item to the retained state of the policy enforcement device, which can be referenced in the future processing of the compiled policy object).

It will be seen that the exact nature of the policy execution system (as discussed in further detail below) will control the expression of the compiled policy objects. The compiled object may be a byte code suitable for execution by a Java Virtual Machine (JVM) or similar virtual machine implementation; it may be conventional binary code directly executable by a CPU; or it may be calls to a programming API. In either case, it will be observed that a device with the general characteristics of a stored-program computer (von Neumann or Turing machine) should be used to execute the compiled policy object. Embodiments of the invention may be implemented to execute on a large variety of devices, ranging from conventional computers; to specialized network elements such as switches and routes; to low-power embedded devices based on gate-array logic.

Policy-Execution Engine

The third principal feature of embodiments of the invention is an engine for executing compiled policy objects written in the policy language, and effectuating the dispositions determined dynamically by the language.

Distinctive elements of the policy-execution engine are: 1) the ability to dynamically recover values for particular controls from a dynamic runtime context; and 2) to execute dispositions meaningfully in the dynamic runtime context. It should be recalled that the action of enforcing objects written in the policy language is to logically evaluate predicates against controls, and execute the resulting dispositions. Thus, the action of the policy engine, when invoked periodically or at specific points in time within a dynamic context, is to iterate through all of the rules in order to discover which dispositions to be executed, and then to execute one or more dispositions.

The following are three examples of implementations of a policy engine, in embodiments of the invention:

1. The Policy-Execution Engine as a Network Element

Embodiments of the invention may employ a policy-execution engine implemented as software and deployed within a network element such as a firewall, switch, or router. The policy-execution engine may be configured with one or more compiled policy objects, or may retrieve policy objects dynamically from elsewhere in the network. It is noted that the operation of the policy-execution engine within a deployed device is distinct from any other functions (such as network firewalling) that may also be implemented on the same device.

In this example, the policy engine will actively observe, parse, and otherwise analyze the communications in the network stream in order to retrieve the instantaneous values for controls that appear in predicates.

In this example, the policy-execution engine may be implemented "in-line," such that it forms an essential link in the communications flows between machines and computers; or it may be deployed on a "network tap," such that it can instantaneously observe network flows as they occur. These two cases admit of different possibilities to effectuate policy dispositions. In particular, in the "in-line" case, the policy-execution engine can selectively block or modify transactions in real time, effectuating a policy of denying or modifying particular operations that may violate local safety or security rules.

It is noted that, while perhaps reminiscent of the operation of prior-art network firewalls, dispositions that block or modify transactions are distinctly different. This is because, rather than executing configuration rules that are expressed in terms of IP addresses, ports, protocols, and other metadata, the present invention executes policy rules that are expressed in terms of machine behaviors and other high level abstractions.

2. Policy-Execution on a Discrete General-Purpose Computer

Embodiments of the invention may be implemented as software running within a general purpose computer, either in a physically remote location from the machine environment for which it executes policy; or at a subsequent point in time. In this case, the dynamic execution context for the policy-execution engine may be, e.g., a stream of descriptions of distinct events of transactions carried in a communications network; or entries in a database or event log containing analogous descriptions of events.

In this case, the policy-evaluation engine is programmed to infer from the event data the appropriate times to invoke a policy object, and also how to determine the dynamic values to be used for each control. In cases where a control appearing in a policy-rule predicate has no meaningful value or is absent altogether, that particular rule will generate no policy disposition.

This implementation model corresponds to the analytics systems which are of particular interest in industry. Embodiments of the invention are capable of expressing behavioral patterns ranging from the very simple and domain-specific, to the extremely complex and domain-agnostic. When executing such policies against archived sets of real telemetry and control loop data forensically (i.e., not in real-time), the policy dispositions will typically take the form of events reported to logs, historians, or database applications. This gives rise to many useful applications, including the prediction of machine failures or conditions requiring maintenance; and the easy detection of unsafe events or operating conditions.

3. Policy-Execution on Embedded Devices

Embodiments of the invention may employ a policy-enforcement engine that is embedded on a small, low-power computing device such as a micro controller or system-on-chip computer, or even in FPGA logic or ASICs. Such an embedded device is constructed so as to have direct physical access to the electrical and/or mechanical control mechanisms of a machine, for purposes of determining the dynamic values of controls, and for effectuating dispositions.

Such a deployment model can be extremely efficient and cost-effective for purposes of protecting expensive, complex machines from the effects of inadvertent or malicious control signals that may arrive at the machine from network connections.

In this scenario, the embedded device is connected so as to be either inline with or able to observe the network traffic as it arrives at the machine, and effectuate policy dispositions that may block or modify the network traffic BEFORE the traffic is allowed to affect the behavior of the machine.

Embodiments of the invention may include large-scale implementations with large numbers of sensors feeding data into an analytics platform, and may further include features such as secure remote access and network segmentation.

Figure 2:
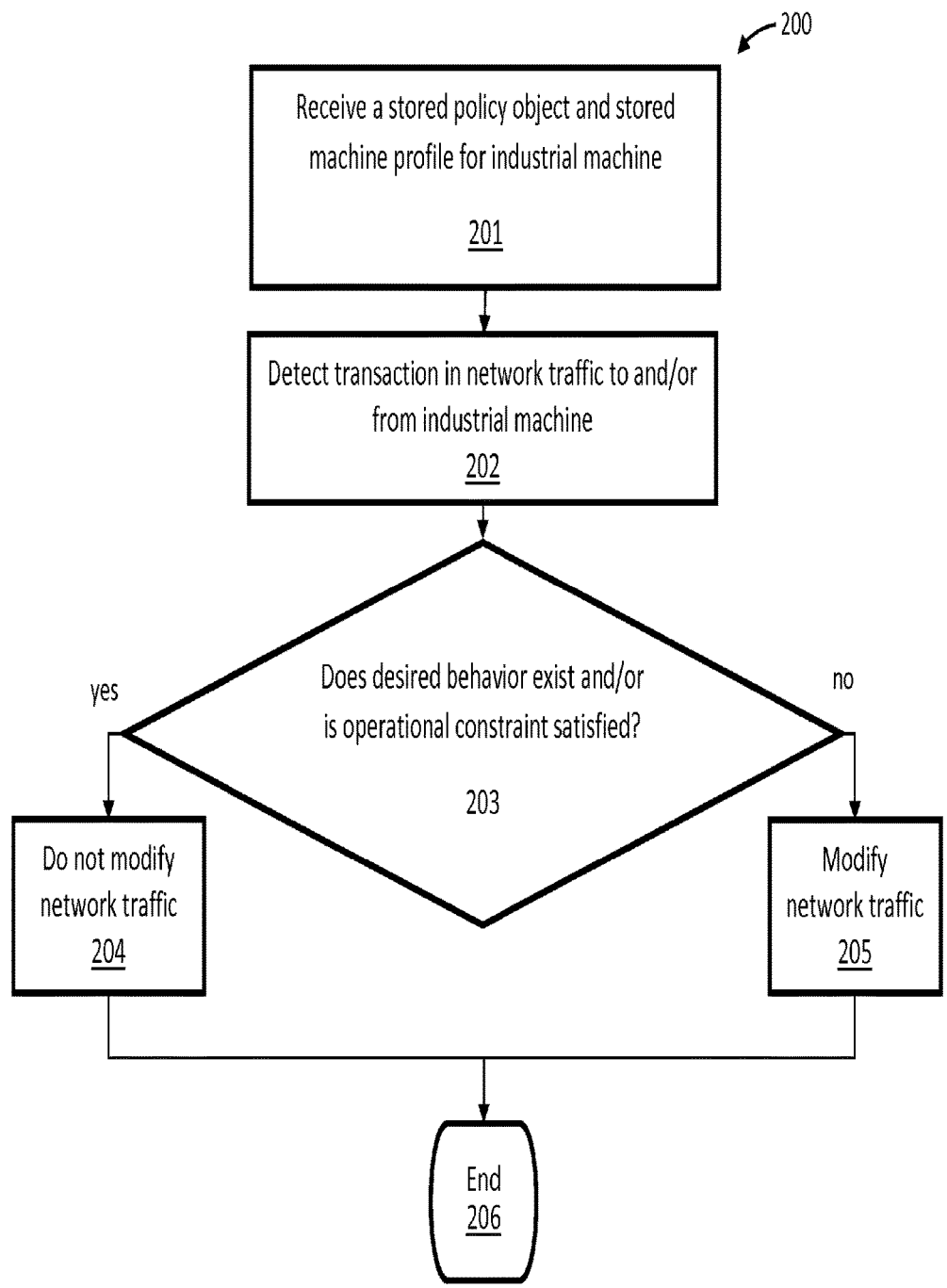
FIG. 2 shows a flowchart of an exemplary process for controlling network traffic to and/or from at least one industrial machine, in one exemplary embodiment of the disclosure.

FIG. 2 shows a flowchart of an exemplary process 200 for controlling network traffic to and/or from at least one industrial machine, in one exemplary embodiment of the disclosure. As shown, first, at step 201, a stored policy object and stored machine profile for an industrial machine are received. Next, at step 202, a transaction is detected in network traffic to and/or from the industrial machine. Next, at step 203, a determination is made whether a desired behavior exists and/or an operational constraint is satisfied, based on the received policy object and received machine profile. If so, then at step 204, no modification to traffic to or from the industrial machine is made, and the process proceeds to step 206. If it is determined at step 203 that the desired behavior does not exist and/or the operational constraint is not satisfied, then at step 205, network traffic to and/or from the industrial machine is modified (or blocked). Next, process 200 ends at step 206 (and process 200 will typically be repeated multiple iterations, including for additional policy objects, machine profiles, and/or transactions).

Alternative Embodiments

It should be understood that various changes in the details, materials, and arrangements of the parts which have been described and illustrated in order to explain the nature of this invention may be made by those skilled in the art without departing from the scope of the invention.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the invention. When implemented on a general-purpose processor, the program code segments combine with the processor to provide a unique device that operates analogously to specific logic circuits.

It will be appreciated by those skilled in the art that although the functional components of the exemplary embodiments of the system of the present invention described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present invention. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the invention as described herein may be implemented in one or more computers residing on a network transaction server system, and input/output access to embodiments of the invention may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the invention, in real-time and/or batch-type transactions. Likewise, the system of the present invention may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, or Apple Safari™). Thus, the present invention may be appropriately adapted to include such communication functionality and Internet browsing ability. Additionally, those skilled in the art will recognize that the various components of the server system of the present invention may be remote from one another, and may further include appropriate communications hardware/software and/or LAN/WAN hardware and/or software to accomplish the functionality herein described.

Each of the functional components of the present invention may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the invention may be server-based and may reside on hardware supporting an operating system such as Microsoft Windows NT/2000™ or UNIX.

Components of a system consistent with embodiments of the invention may include mobile and non-mobile devices. Mobile devices that may be employed in the present invention include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the invention include 2.5G cellular network technologies such as GPRS and EDGE, as well as 3G technologies such as CDMA1×RTT and WCDMA2000, and 4G technologies. Although mobile devices may be used in embodiments of the invention, non-mobile communications devices are also contemplated by embodiments of the invention, including personal computers, Internet appliances, set-top boxes, landline telephones, etc. Clients may also include a PC that supports Apple Macintosh™, Microsoft Windows 95/98/NT/ME/CE/2000/XP/Vista/7™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to the present invention. These personal computers may run the Unix, Microsoft Windows NT/2000™ or Windows 95/98/NT/ME/CE/2000/XP/Vista/7™ operating systems. The aforesaid functional components of a system according to the present invention may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present disclosure may also be part of a larger system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present disclosure to achieve additional functionality.

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present disclosure include Java, HTML, Perl, UNIX shell scripting, assembly language, Fortran, Pascal, Visual Basic, and QuickBasic. Those skilled in the art will recognize that embodiments of the present disclosure may be implemented in hardware, software, or a combination of hardware and software.

Accordingly, the terms "computer" or "system," as used herein, should be understood to mean a combination of hardware and software components including at least one machine having a processor with appropriate instructions for controlling the processor. The singular terms "computer" or "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present disclosure. Thus, embodiments of the disclosure are intended to cover all such alternatives, modifications, and equivalents as may be included within the spirit and broad scope of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of this disclosure may be made by those skilled in the art without departing from the scope of the disclosure as expressed in the following claims.

The embodiments covered by the claims in this application are limited to embodiments that (1) are enabled by this specification and (2) correspond to statutory subject matter.

Non-enabled embodiments and embodiments that correspond to non-statutory subject matter are explicitly disclaimed even if they fall within the scope of the claims.

What is claimed is:

1. A processor-implemented method comprising:
a processor receiving, as input: a policy object having a first language, the policy object defining an operational constraint for an industrial machine, the industrial machine using a second language that is a control language and is different from the first language; and a machine profile defining an association between the first language and at least one control signal for the industrial machine;
the processor detecting, in network traffic to the industrial machine, a communication associated with a transaction;
the processor applying the received policy object and the received machine profile to the detected transaction to determine whether the operational constraint is satisfied;
the processor automatically translating the detected communication from the first language into the second language for use by the industrial machine; and
the processor modifying network traffic to the industrial machine based on the determination whether the operational constraint is satisfied.

2. The method of claim 1, wherein the industrial machine includes an assembly robot.

3. The method of claim 1, wherein the network traffic is traffic of a converged network including the industrial machine and a compute device.

4. The method of claim 1, wherein the modifying the network traffic includes blocking the transaction.

5. A policy-object enforcement device comprising:
a processor,
wherein the processor, during use:
receives, as input: a policy object having a first language, the policy object defining an operational constraint for an industrial machine, the industrial machine using a second language that is a control language and is different from the first language; and a machine profile defining an association between the first language and at least one control signal for the industrial machine;
detects, in network traffic to the industrial machine, a communication associated with a transaction;
applies the received policy object and the received machine profile to the detected transaction to determine whether the operational constraint is satisfied;
automatically translates the detected communication from the first language into the second language for use by the industrial machine; and
modifies network traffic to the industrial machine based on the determination whether the operational constraint is satisfied.

6. The device of claim 5, wherein the industrial machine includes an assembly robot.

7. The device of claim 5, wherein the network traffic is traffic of a converged network including the industrial machine and a computing device.

8. The device of claim 5, wherein the processor modifies the network traffic by blocking the transaction.

9. A device, comprising:
a memory; and
a processor in communication with the memory and configured to be operatively coupled to a network,
the processor, during use:
receiving, as input, a policy object having a first language, the policy object defining an operational constraint for an industrial machine, the industrial machine using a second language that is a control language and is different from the first language;
detecting, in traffic of the network, a communication associated with the industrial machine;
applying the received policy object to the detected communication to determine whether the operational constraint is satisfied;
automatically translating the detected communication from the first language into the second language for use by the industrial machine; and
modifying the traffic of the network to the industrial machine based on the determination whether the operational constraint is satisfied.

10. The device of claim 9, wherein the processor modifies the traffic of the network by blocking the communication.

11. The device of claim 9, wherein the industrial machine includes an assembly robot.

12. The device of claim 9, wherein the traffic of the network is traffic of a converged network including the industrial machine and a computing device.

13. The device of claim 9, wherein the communication associated with the industrial machine includes a control signal.

14. The device of claim 9, wherein the operational constraint is associated with a machine behavior.

15. The device of claim 9, wherein the processor the traffic of the network to the industrial machine by at least one of:
preventing a transaction of the detected communication;
permitting a transaction of the detected communication; or
modifying a parameter of the detected communication.

16. The device of claim 9, wherein the processor, during use, further:
issues a system alert; or
adds a data item to the policy object.

* * * * *

UNITED STATES PATENT AND TRADEMARK OFFICE
CERTIFICATE OF CORRECTION

PATENT NO. : 10,075,415 B2
APPLICATION NO. : 15/685649
DATED : September 11, 2018
INVENTOR(S) : Francis Cianfrocca Page 1 of 1

It is certified that error appears in the above-identified patent and that said Letters Patent is hereby corrected as shown below:

In the Claims

Column 28, Line 43 (Claim 15, Line 1): "wherein the processor the" should read "wherein the processor modifies the"

Signed and Sealed this
Sixth Day of November, 2018

Andrei Iancu
*Director of the United States Patent and Trademark Office*